(No Model.)
H. NICHOLS.
GUIDE LINE FOR PLANTING PURPOSES.
No. 477,776. Patented June 28, 1892.
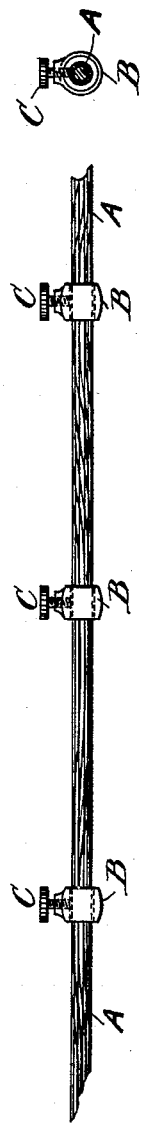
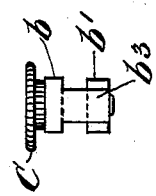
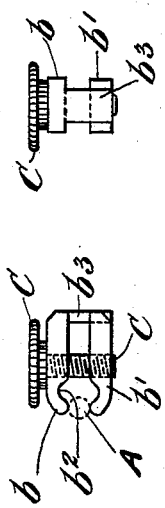
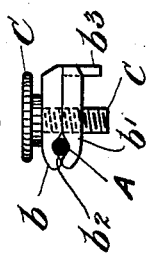
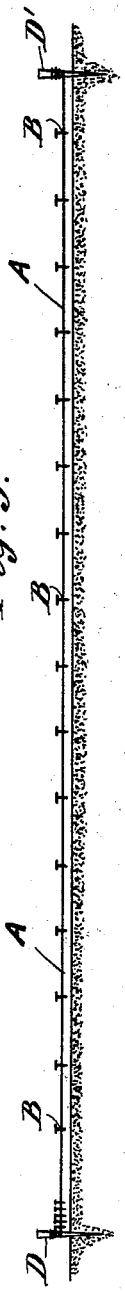
Witnesses:
M. Washington Miller
C. W. Brooke.
Inventor.
Henry Nichols,
By his Attorneys,
Baldwin, Davidson & Wight

United States Patent Office.

HENRY NICHOLS, OF HUNSLET, NEAR LEEDS, ENGLAND.

GUIDE-LINE FOR PLANTING PURPOSES.

SPECIFICATION forming part of Letters Patent No. 477,776, dated June 28, 1892.

Application filed September 28, 1891. Serial No. 407,065. (No model.) Patented in England February 21, 1891, No. 3,196.

*To all whom it may concern:*

Be it known that I, HENRY NICHOLS, a subject of the Queen of Great Britain, residing at Sturton Hunslet, near Leeds, in the county of York, England, have invented new and useful Improvements in Guide-Lines for Planting Purposes, (for which I have secured Letters Patent in Great Britain, No. 3,196, dated February 21, 1891,) of which the following is a specification.

Hitherto under the present system there has been great difficulty where ordinary ropes or cords are employed in marking the lines or positions for plants or roots so as to make them uniform and straight, owing to the ropes or cords when new being liable to stretch and also to be greatly affected by the moisture or dryness of the weather, rendering it almost impossible without considerable difficulty and care to plant evenly or with uniformity.

This invention relates to improvements in guide-lines for planting purposes in which adjustable markers are mounted, each of which may be adjusted independently of the other; and the objects of my improvements are, first, to enable gardeners, nurserymen, farmers, and others to set plants or roots or to pierce or hole where such plants or roots are to be set in uniform or straight lines, simplifying thereby the work of setting, piercing, or holing and dispensing with what is known as "drilling" or "grooving;" second, to provide a guide-line that will not be affected generally by moisture or the weather, and, third, to afford facilities for the adjustment of the markers independently of each other. I attain these objects by the apparatus illustrated in the accompanying drawings, in which—

Figure 1 shows the construction of guide-lines; Fig. 2, an end elevation; Fig. 3, mode of applying the invention; Fig. 4, an end elevation showing detachable marker closed upon the guide-line. Fig. 5 shows the same open for removal; Fig. 6, an end elevation of marker shown at Fig. 5.

Similar letters refer to similar parts throughout the several views.

A is the guide-line, which may consist of a metallic cord of twisted wires or of a light wire without twist or of a body portion or core of fibrous material around which is coiled or laid a metallic covering, such as wire, such metallic cord or wire not being effected by moisture or weather generally. On the above-mentioned guide-line A are placed any desired number of adjustable and detachable markers B, made of metal or other suitable material. The markers B are fixed any desired distance apart by set-screws C, such position being the required distance between each plant or root or holes for the same, as shown at Fig. 3, the adjustment thereof being easily effected through the medium of a gage provided for the purpose.

When preferred, instead of employing the solid markers B, which span the guide-line and have to be put on from the end of said line, I employ the clamp-markers constructed as shown at Figs. 4, 5, and 6, which consist of an upper plate $b$ and lower plate $b'$, having suitable openings $b^2$ therein to receive the guide-line. The upper plate $b$ is provided with a pendent heel-piece $b^3$, which slides freely in a recess formed for its reception in the rear end of the lower plate $b'$, as shown at Fig. 6. The two pieces $b\ b'$ are brought together and fixed onto the guide-line A by set-screw C, as shown at Fig. 4, the heel-piece $b^3$ aiding in retaining the two plates in position as regards each other. This arrangement dispenses with the flattening of the guide-line and is readily removed therefrom, as shown at Fig. 5, and will be found more convenient on account of the user being able to take them off at any point instead of having to draw them off the guide-line the full length thereof.

The above-mentioned guide-line A is used in a similar manner to the ordinary cord—that is, partially wound round and stretched taut between two supports D D', as shown at Fig. 3; but the markers show the position where the plants or roots are to be set or the holes to be made for such plants or roots, so that whatever number of guide-lines are laid the position of plants or roots or holes for the same are set uniform and straight with each other.

What I claim is—

1. The adjustable markers having two plates $b\ b'$, attached together by a screw C at one end and by a sliding heel-piece $b^3$, substantially as shown, for the purposes specified.

2. The combination, in a guide-line for planting purposes, of the line A, having a fibrous center or body portion and a metallic covering, and the adjustable and detachable markers B, secured to said line A by screws C and adapted to be independently fixed at intervals thereon, substantially as herein set forth.

In testimony whereof I have hereunto signed my name, at Leeds, in the county of York, England, the 16th day of September, A. D. 1891, in the presence of two subscribing witnesses.

HENRY NICHOLS.

Witnesses:
W. FAIRBURN HART,
CHARLES BLOW.